United States Patent Office 3,064,012
Patented Nov. 13, 1962

3,064,012
DERIVATIVES OF COENZYME Q$_{10}$
Karl Folkers, Plainfield, and Donald E. Wolf, Princeton, N.J., assignors to Merck & Co., Inc., Rahway, N.J., a corporation of New Jersey
No Drawing. Filed July 20, 1960, Ser. No. 44,013
6 Claims. (Cl. 260—345.5)

This invention relates to new chroman compounds which are useful antioxidants and methods of preparing the same. More particularly, it is concerned with 2,5-dimethyl-2-(3'-methyl - 2' - butenyl-octakis(3'-methyl-2'-butenylene)-methyl - 6-hydroxy - 7,8 - dimethoxychroman and 2,5 - dimethyl-2-(4',8'12',16',20',24',28',32',36'- nonamethylheptatricontanyl) - 6 - hydroxy - 7,8 - dimethoxy chroman, acyl derivatives thereof, and methods of preparing these compounds.

This application is a continuation-in-part of our copending application Serial No. 19,581, now abandoned, filed April 14, 1960 which in turn is a continuation-in-part of our copending application Serial No. 815,307, now abandoned, filed May 25, 1959.

It is an object of the present invention to provide new chroman compounds having antioxidant activity. Another object is to provide processes for the preparation of these compounds and their acylated derivatives. Other objects will be apparent from the detailed description of my invention hereinafter provided.

The new chroman compounds of the present invention are represented by the formulas

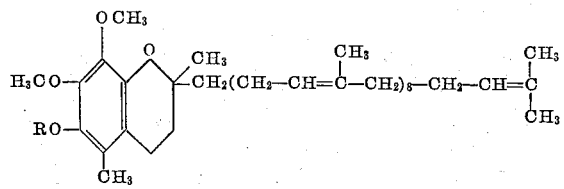

I and

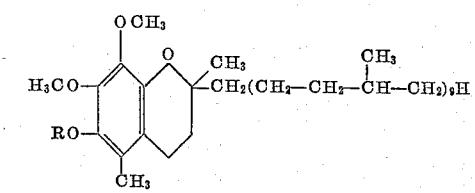

IV in which R represents hydrogen or an acyl group. Compound I above is also referred to herein as the "chroman of Coenzyme Q$_{10}$."

The starting material for the preparation of the new chromans of the present invention is "Coenzyme Q," an essential quinone which is involved in respiratory metabolism and has been discovered in heart muscle tissue as an effective part of the system of oxidative metabolism (cf. Prof. David E. Green, in The Harvey Lectures (1956–57), p. 177, Academic Press, New York; Crane, Hatefi, Lester and Widmer, Biochim. Biophys. Acta 25, 220 (1957)). The processes by which coenzyme Q is converted to the new chromans of our invention can be illustrated structurally as follows:

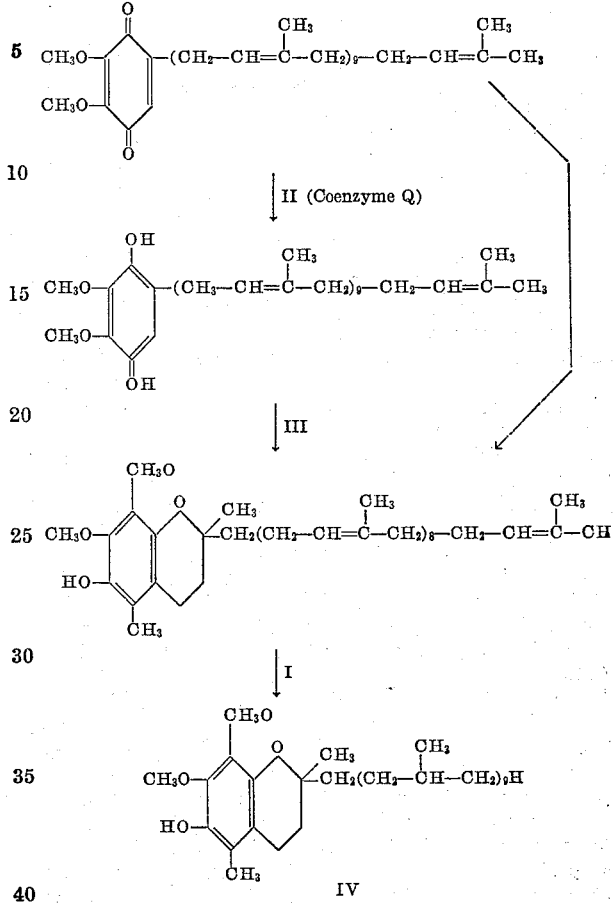

In accordance with one embodiment of the present invention, the starting material, Compound II or coenzyme Q, is heated under reduced pressure to produce Compound I or 2,5-dimethyl-2-(3'-methyl-2'-butenyl-octakis(3' - methyl-2'-butenylene)-methyl-6-hydroxy-7,8-dimethoxychroman. Thus, Compound I is obtained when coenzyme Q is heated to a temperature in excess of about 250° C., preferably between 250–280° C. at about 1 to 10 microns pressure. Under these conditions, the desired product distills off and can readily be recovered in accordance with methods known in this art.

Pursuant to a further embodiment of our process, the chroman Compound I is also prepared by first reducing the quinone compound to the corresponding hydroquinone and then heating the hydroquinone in the presence of a suitable acid catalyst to a temperature in excess of about 50° C. The first step of this process comprising the reduction of the quinone compound can be carried out by a number of different procedures. Thus, the reduction can be effected by treatment with reducing agents such as sodium borohydride, metal and acid combinations or sodium hydrosulfite. The second step of the reaction is carried out by heating the hydroquinone in the presence of a suitable acid catalyst such as phosphorus pentoxide, p-toluene sulfonic acid, sulfuric acid, formic acid and the like. Alternatively, the conversion of the hydroquinone to the chroman compound can be effected by heating the hydroquinone in the presence of a catalyzing agent such as zinc chloride, potassium bisulfate, zinc sulfate, pyridine hydrochloride, mercuric chloride, aluminum chloride, cobalt chloride and the like. Generally, in carrying out this step of the process, it is desirably effected in the presence of a suitable solvent for the hydroquinone such as glacial acetic acid, dioxane, acetic anhydride and the like at a temperature of about 100° C. or above.

In accordance with a preferred embodiment of the present invention, it is found that the chroman compound can be most conveniently prepared by heating a solution of coenzyme Q hydroquinone in glacial acetic acid to reflux temperature, adding potassium bisulfate thereto in an amount sufficient to exceed the solubility so that an excess of solid material is present and continuing the heating under reflux for sufficient time to complete the formation of the desired chroman compound. Alternatively, in place of using glacial acetic acid in this process, other suitable solvents boiling at about 100° C. such as dioxane can also be employed.

In accordance with a further embodiment of our invention, the chroman Compound I can be hydrogenated to produce the corresponding polyhydro derivative, Compound IV. This reduction can be readily and conveniently carried out by catalytic hydrogenation in the presence of a noble metal catalyst such as palladium at low pressures, for example, 1–5 atmospheres.

The new chromans of the present invention, namely, Compounds I and IV, can be readily converted to the corresponding acyl derivatives by reaction with suitable acylating agents. The acylated derivatives thus obtained are useful products which are valuable means of identifying and further purifying the chroman compounds. In addition, the acylated derivatives are useful since they are less sensitive to oxygen and peroxide and hence can be stored for longer periods of time without deterioration. Although any of the various acyl derivatives can be used, I have found that the acyl derivatives of carboxylic acids having from one to nine carbon atoms are especially useful, and these acyl compounds represent preferred embodiments of the present invention. These acylated compounds are readily prepared by reacting the chromans with the appropriate carboxylic acid chlorides or anhydrides, preferably in the presence of a suitable base such as pyridine or a complex-forming agent. The acylated chromans are readily reconverted to the corresponding chromans by mild acid hydrolysis or by reaction with lithium aluminum hydride or Grignard reagent.

The new chromans of the present invention are useful antioxidants which can be used to inhibit the oxidation of various animal and vegetable fats and oils. These chromans can be used either by themselves or in combination with other antioxidant materials which are known in the art as antioxidants.

The following examples are given to illustrate the procedures for the preparation of the new compounds of the present invention:

EXAMPLE I

Production of the Chroman of coenzyme $Q_{10}$ from the quinone (coenzyme $Q_{10}$, II) is carried out as follows:

Twenty-nine milligrams of coenzyme $Q_{10}$ was placed in a 10 mm. tube closed on one end and evacuated on a mercury vapour pump to 1–10-microns pressure. The tube was heated around the sample. At 250–280° a light yellow distillate (oil) was collected in the cool portion of the tube. This distillate was the chroman, i.e., 2,5-dimethyl - 2 - (3' - methyl - 2' - butenyl) - octakis - (3' - methyl-2' - butenylene) - methyl - 6 - hydroxy - 7,8 - dimethoxy-chroman (Ia). In the infra-red region it showed the absorption bands expected of such a formula as follows (solvent, carbon tetrachloride):

| Band | Structural Indication |
| --- | --- |
| 2.70μ | —OH. |
| 6.65μ | C=O absent. phenyl. |

Spectrum similar to that of α-tocopherol.

EXAMPLE II

Preparation of the chroman of coenzyme $Q_{10}$ from the hydroquinone of coenzyme $Q_{10}$:

The hydroquinone of coenzyme $Q_{10}$ (III) was prepared from the quinone by dissolving 100 mg. of coenzyme $Q_{10}$ (II) in ethanol and adding excess sodium hydrosulfite as an aqueous solution; this completely removed the original yellow-orange color. The solution was diluted with two volumes of water and extracted three times with petroleum ether. The petroleum ether extracts were washed with water, dried over magnesium sulfate, filtered and evaporated under vacuum to a residual oil. (The product is protected from air oxidation throughout by an atmosphere of nitrogen or carbon dioxide.) When pumped free of residual solvent, the oil crystallized. (From the crystalline residue, the pure hydroquinone of coenzyme $Q_{10}$ (III) may be recrystallized from alcohol-petroleum ether mixtures, M.P. 47°.) This hydroquinone is used, however, as the residue obtained directly from solvent extraction; this is dissolved in methanol-benzene solution (3:1, approximately 40 ml.), to this is added 100 mg. of solid potassium bisulfate and the mixture is refluxed under a protective atmosphere for one to eight hours.

The solution is cooled, diluted with two volumes of water, extracted three times with petroleum ether, and the extract is washed with water, dried over magnesium sulfate, filtered and concentrated under vacuum, leaving approximately 0.9 g. of an oily residue of the chroman of coenzyme $Q_{10}$.

The crude chromane preparation was purified by chromatography on Florisil. The total crude product was dissolved in isooctane and placed on a column containing 50 g. of Florisil. The column was developed with 5% ethyl ether in isooctane and the eluate followed by observation of U.V. absorption at 292 mμ. From the appropriate column fractions 50 mg. of coenzyme $Q_{10}$ chromane was obtained as a light yellow oil with the following properties:

$$\lambda_{max}.\ 292\ m\mu,\ E^{1\%}_{1\ cm.}=38$$

The I.R. spectrum (neat) was characterized by bands at 2.85μ (—OH), absence of a band for C=O in the 6μ region and a band at 9μ.

The N.M.R. spectrum was consistent with the chromane structure. The observed bands and their assignment in carbon tetrachloride solution are tabulated below:

| Tau | Assignment |
| --- | --- |
| 4.84 | —OH |
| 4.96 | HC= |
| 6.12 | CH₃O— |
| 6.25 | CH₃O— |
| 7.50 (triplet) | —CH₂C= |
| 7.98 | CH₃C= (ring) |
| 8.02 | =C(CH₂)₂C= |
| 8.40 | CH₃C= |
| 8.73 | CH₃CH—O— |

EXAMPLE III

Acetylation of the chroman from coenzyme $Q_{10}$:
Approximately 200 mg. of the chroman from coenzyme $Q_{10}$, prepared as exemplified in Example I was treated with a mixture of 1 ml. of acetic anhydride and 3 ml. of anhydrous pyridine; the resulting reaction mixture was heated for one hour at 60° C.

The acetate thus formed was obtained by diluting the reaction mixture with 3 volumes of water and extracting with ether. The ether extract was washed successively with dilute hydrochloric acid, water, 10% sodium bicarbonate solution and water. The ether extract was dried over magnesium sulfate, filtered and evaporated at reduced pressure.

This residual acetate i.e., 2,5-dimethyl-2-(3'-methyl-2'-butenyl-octakis(3'methyl-2'butenylene))methyl - 6 - acetoxy-7,8-dimethoxy chroman (Ib) was light yellow oil. In isooctane solution the sample showed an ultraviolet absorption band at 282 m$\mu$;

$$E_{1\ cm.}^{1\%} = 21$$

The N.M.R. spectrum is consistent with the chromane acetate structure. The data is tabulated below:

| Tau | Assignment |
|---|---|
| 4.97 | HC= |
| 5.35 | HC= |
| 6.25 | CH$_3$O— |
| 7.45 (m) | CH$_2$ aromatic |
| 7.77 | CH$_3$C=O |
| 8.02 | =C(CH$_2$)$_2$C= |
|  | CH$_3$C=(ring) |
| 8.40 | CH$_3$C= |
| 8.70 | CH$_3$C—O |

EXAMPLE IV

Preparation of the p-nitrobenzoate of the chroman of coenzyme $Q_{10}$:

Approximately 100 mg. of the chroman of coenzyme $Q_{10}$ (I) produced as exemplified in Examples I and II was treated with 100 mg. of p-nitrobenzoyl chloride and 2 ml. of dry pyridine at 100° for one hour.

The reaction mixture was diluted with 2 volumes of water and extracted with ether. The ether extract was washed successively with dilute hydrochloric acid, water, 10% sodium bicarbonate solution and water. It was dried over magnesium sulfate, filtered, and the ether evaporated at reduced pressure.

The residual p-nitrobenzoate of the chroman, i.e., 2,5-dimethyl-2-(3'-methyl-2'-butenyl - octakis(3' - methyl - 2-butenylene))-methyl-6-p-nitrobenzoyloxy-7,8 - dimethoxy chroman (Ic), was crystallized from ethanol or from a mixture of acetone and petroleum ether, M.P. about 112°.

The infrared spectrum was observed in carbon tetrachloride solution:

| Band | Structural Indications |
|---|---|
| 5.71$\mu$ | carbonyl (ester). |
| 6.17$\mu$ | phenyl. |
| 6.48$\mu$, 7.39$\mu$ | nitro. |
| 9$\mu$ region | —C—O—C—. No —OH band. |

The ultraviolet absorption spectrum was observed in isooctane and showed a strong band at 255 m$\mu$, $$E_{1\ cm.}^{1\%} = 278$$

inflections at 290 m$\mu$, $E_{1\ cm.}^{1\%} = 62.2$ and 305 m$\mu$, $E_{1\ cm.}^{1\%} = 36.6$

EXAMPLE V

Hydrogenation of the chroman from coenzyme $Q_{10}$:

A solution of 100 mg. of the chroman from coenzyme $Q_{10}$, prepared as exemplified in Examples I and II, is made in 50 ml. of ethanol (free of benzene, for catalytic use), approximately 100 mg. of 5% palladium (on charcoal support) catalyst is added, and the mixture is agitated with hydrogen gas under one to three atmospheres pressure for three to five hours at room temperature until absorption is essentially complete. The catalyst is removed by filtration, and the filtrate is concentrated under vacuum and pumped free of residual solvent. The residual, essentially colorless, oil is substantially pure 2,5-dimethyl-2-(4',8',12',16',20',24',28',32',36' nonamethyl-heptatricontanyl)-6-hydroxy-7,8-dimethoxy chroman (IVa) as shown by the absence of bands for olefinic (—CH=) protons in the nuclear magnetic resonance spectrum.

EXAMPLE VI

By treatment of 100 mg. of the hydrogenated chroman, obtained according to the method illustrated in Example V, with 0.5 ml. of acetic anhydride and 1.5 ml. of anhydrous pyridine according to the method of Example III, the acetate of the hydrogenated chroman (IVb, i.e., 2,5-dimethyl - 2 - (4',8',12',16',20',24',28',32',36' - nonamethyl-heptatricontanyl)-6-acetoxy-7,8-dimethoxy - chroman) is obtained as a colorless oil.

EXAMPLE VII

A solution of 100 mg. of coenzyme Q in about 5 ml. of glacial acetic acid was heated to boiling under a reflux condenser and sufficient stannous chloride added to decolorize the solution. The heating under reflux was continued for about fifteen minutes. The acetic acid was then evaporated at reduced pressure and the resulting residue was extracted with ether. The ether layer was washed repeatedly with water, dried over magnesium sulfate and then evaporated to obtain a minor amount of the chromane, 2,5-dimethyl-2-(3'-methyl - 2' - butenyl-octakis(3'-methyl - 2'-butenylene)) - methyl-6-hydroxy - 7,8 - dimethoxychroman, mixed with a major portion of a chroman compound corresponding to the aforementioned but differing in that the unsaturated side chain has undergone internal cyclization to produce a side chain of fused cycloaliphatic rings of uncertain structure.

The new chromans of the present invention are useful antioxidants which can be utilized to inhibit the oxidative rancidity which occurs during the storage and handling of oleaginous materials such as vegetable and animal oils and fats. Thus, the addition of amount of 0.05 to about 0.1% of these chromans will inhibit the formation of peroxides which is indicative of the occurrence of rancidity. For example, the antioxidant properties of the chromans in inhibiting the oxidative rancidity of corn oil by the modified Schoal test is carried out as follows:

Corn oil (obtained without any commercially added antioxidants, and free of corn germ oil) is added to a 100 ml. beaker until a weight of fifty grams of said oil has been introduced. One beaker, so filled is used as a control; other beakers of the same size and type are filled with the same amount of corn oil, one being provided for each sample or mixture to be tested. To the test beakers, taken individually, are added suitable amounts of the individual sample to be tested; in the case of the chroman of coenzyme $Q_{10}$ 0.05% to 0.1% is added and mixed well with the corn oil.

All beakers are then heated in a thermostatically controlled bath at 62° C., for six days. At the end of four, five, and six days, aliquots of five ml. are withdrawn from each beaker. Each aliquot is mixed with 30 ml. of glacial acetic acid-chloroform solution (6:4) and to each of the resulting solutions, an 0.5 ml. portion of saturated potassium iodide solution (in water) is added with good mixing until clear. The brownish color developed in each tube is compared with standards of the Master Color Series. It will be noted that color develops soonest in the control, and 2 or more days of additional heating is required for samples containing antioxidants.

Various changes and modifications may be made in carrying out the present invention without departing from the spirit and scope thereof. Insofar as these changes and modifications are within the purview of the annexed claims, they are to be considered as part of our invention.

What is claimed is:
1. A chroman compound of the formula

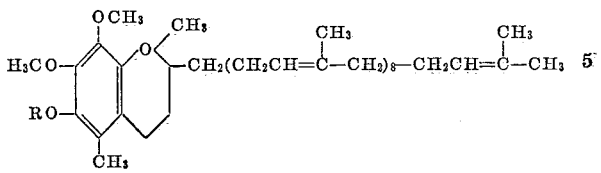

wherein R is a member from the group consisting of hydrogen, p-nitrobenzoyl, and alkanoyl radicals having from one to nine carbon atoms.

2. A chroman compound of the formula

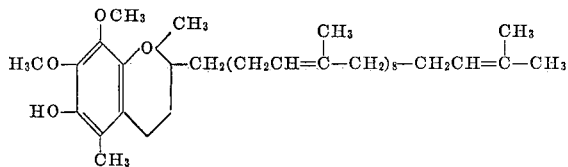

3. A chroman compound of the formula

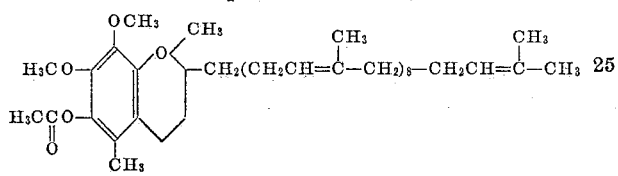

4. A chroman compound of the formula

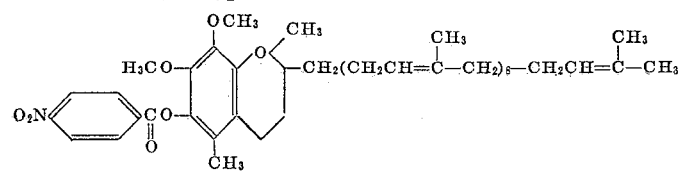

5. The process for producing a chroman compound which comprises reacting a quinone compound of the formula

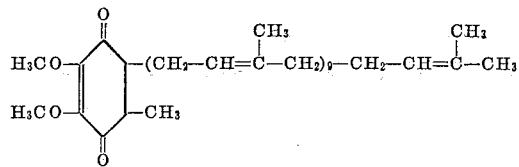

with potassium bisulfate at a temperature in excess of about 50° C. to produce a compound of the formula

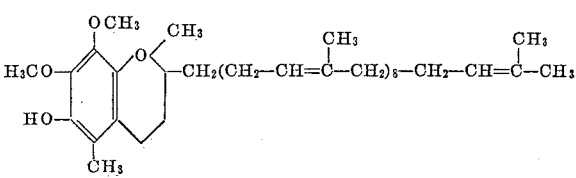

6. The process of claim 5 wherein the reaction is carried out in glacial acetic acid at a temperature of about 100° C.

References Cited in the file of this patent

Noller: Chemistry of Organic Compounds, second edition, page 504 (1957).

UNITED STATES PATENT OFFICE
CERTIFICATE OF CORRECTION

Patent No. 3,064,012                          November 13, 1962

Karl Folkers et al.

It is hereby certified that error appears in the above numbered patent requiring correction and that the said Letters Patent should read as corrected below.

Column 7, lines 3 to 9, the formula should appear as shown below instead of as in the patent:

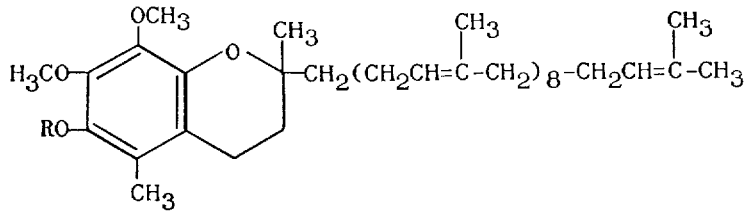

lines 14 to 20, the formula should appear as shown below instead of as in the patent:

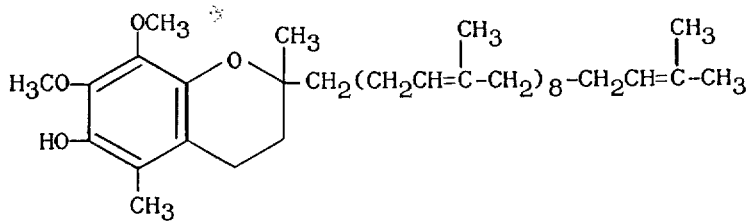

lines 23 to 29, the formula should appear as shown below instead of as in the patent:

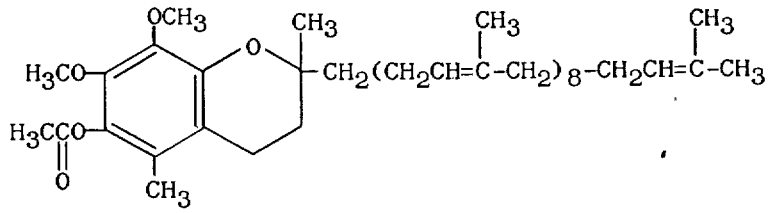

3,064,012 lines 31 to 38, the formula should appear as shown below instead of as in the patent:

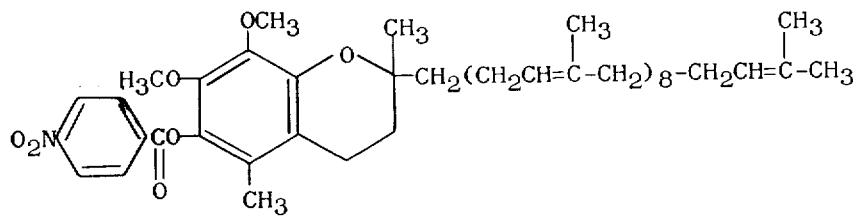

column 8, lines 6 to 13, the formula should appear as shown below instead of as in the patent:

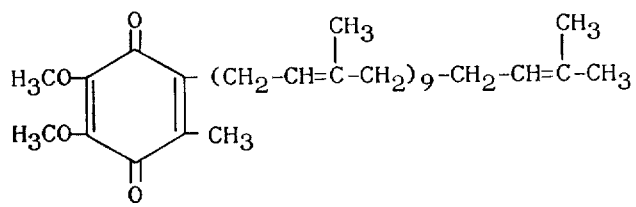

lines 20 to 26, the formula should appear as shown below instead of as in the patent:

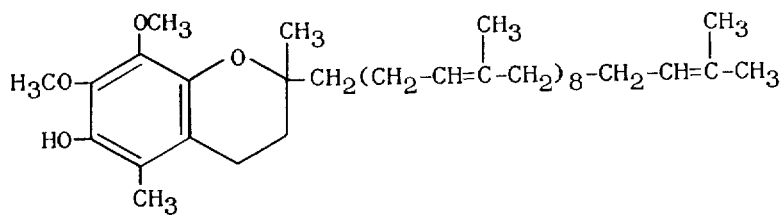

Signed and sealed this 29th day of October 1963.

(SEAL)
Attest:

ERNEST W. SWIDER
Attesting Officer

EDWIN L. REYNOLDS
Acting Commissioner
of Patents